United States Patent
Arcas et al.

(10) Patent No.: US 10,951,819 B2
(45) Date of Patent: Mar. 16, 2021

(54) IMAGE CAPTURE AND ORDERING

(71) Applicant: Microsoft Technology Licensing, LLC, Redmond, WA (US)

(72) Inventors: Blaise Aguera y Arcas, Seattle, WA (US); Markus Unger, Graz (AT); Donald A. Barnett, Monroe, WA (US); David Maxwell Gedye, Seattle, WA (US); Sudipta Narayan Sinha, Redmond, WA (US); Eric Joel Stollnitz, Kirkland, WA (US); Johannes Kopf, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 15/939,220

(22) Filed: Mar. 28, 2018

(65) Prior Publication Data
US 2018/0220072 A1   Aug. 2, 2018

Related U.S. Application Data

(63) Continuation of application No. 15/603,568, filed on May 24, 2017, now Pat. No. 9,973,697, which is a (Continued)

(51) Int. Cl.
*H04N 5/00* (2011.01)
*H04N 5/232* (2006.01)
*G06T 3/40* (2006.01)

(52) U.S. Cl.
CPC ....... *H04N 5/23238* (2013.01); *G06T 3/4038* (2013.01)

(58) Field of Classification Search
CPC .... H04N 5/23238; H04N 9/43; G06T 3/4038; G01N 21/21; G01S 7/499; G01S 11/12; G01S 17/02
See application file for complete search history.

(56) References Cited

U.S. PATENT DOCUMENTS

| 6,044,181 | A | 3/2000 | Szeliski et al. |
| 6,084,592 | A | 7/2000 | Shum et al. |

(Continued)

FOREIGN PATENT DOCUMENTS

| CN | 101119442 A | 2/2008 |
| CN | 101681525 A | 3/2010 |

(Continued)

OTHER PUBLICATIONS

"Office Action Issued in European Patent Application No. 14724823.1", dated Feb. 12, 2019, 6 Pages.
(Continued)

*Primary Examiner* — Frank F Huang

(57) ABSTRACT

One or more techniques and/or systems are provided for ordering images for panorama stitching and/or for providing a focal point indicator for image capture. For example, one or more images, which may be stitched together to create a panorama of a scene, may be stored within an image stack according to one or more ordering preferences, such as where manually captured images are stored within a first/higher priority region of the image stack as compared to automatically captured images. One or more images within the image stack may be stitched according to a stitching order to create the panorama, such as using images in the first region for a foreground of the panorama. Also, a current position of a camera may be tracked and compared with a focal point of a scene to generate a focal point indicator to assist with capturing a new/current image of the scene.

20 Claims, 10 Drawing Sheets

Related U.S. Application Data continuation of application No. 13/826,091, filed on Mar. 14, 2013, now Pat. No. 9,712,746.

(56) References Cited

U.S. PATENT DOCUMENTS

| | | |
|---|---|---|
| 6,167,151 A | 12/2000 | Albeck et al. |
| 6,222,555 B1 | 4/2001 | Christofferson et al. |
| 6,246,412 B1 | 6/2001 | Shum et al. |
| 6,271,855 B1 | 8/2001 | Shum et al. |
| 6,359,617 B1 | 3/2002 | Xiong |
| 6,456,323 B1 | 9/2002 | Mancuso et al. |
| 6,639,596 B1 | 10/2003 | Shum et al. |
| 6,762,769 B2 | 7/2004 | Guo et al. |
| 6,771,304 B1 | 8/2004 | Mancuso et al. |
| 6,885,392 B1 | 4/2005 | Mancuso et al. |
| 6,905,218 B2 | 6/2005 | Courchesne |
| 7,006,124 B2 | 2/2006 | Peleg et al. |
| 7,010,158 B2 | 3/2006 | Cahill et al. |
| 7,095,905 B1 | 8/2006 | Peterson |
| 7,248,738 B2 | 7/2007 | Ho et al. |
| 7,580,952 B2 | 8/2009 | Logan et al. |
| 7,583,288 B2 | 9/2009 | Uyttendaele et al. |
| 7,683,948 B2 | 3/2010 | Yanof et al. |
| 7,936,915 B2 | 5/2011 | Brown et al. |
| 8,064,559 B2 | 11/2011 | Denk et al. |
| 8,249,390 B2 | 8/2012 | Park et al. |
| 8,250,476 B2 | 8/2012 | Hamilto et al. |
| 8,264,504 B2 | 9/2012 | Naimark |
| 8,350,850 B2 | 1/2013 | Steedly et al. |
| 8,620,095 B2 | 12/2013 | Sinha et al. |
| 8,751,156 B2 | 6/2014 | Musabji et al. |
| 8,787,700 B1 | 7/2014 | Aly et al. |
| 9,094,615 B2* | 7/2015 | Aman .................. H04N 5/262 |
| 9,196,072 B2 | 11/2015 | Oh et al. |
| 9,214,138 B2 | 12/2015 | Unger et al. |
| 9,305,371 B2 | 4/2016 | Arcas et al. |
| 9,712,746 B2 | 7/2017 | Arcas et al. |
| 9,818,219 B2 | 11/2017 | Unger et al. |
| 9,865,077 B2 | 1/2018 | Unger et al. |
| 9,973,697 B2 | 5/2018 | Arcas et al. |
| 2004/0104935 A1 | 6/2004 | Williamson et al. |
| 2004/0189849 A1 | 9/2004 | Hofer |
| 2005/0062869 A1 | 3/2005 | Zimmermann et al. |
| 2006/0132482 A1 | 6/2006 | Oh |
| 2007/0008312 A1 | 1/2007 | Zhou et al. |
| 2007/0236514 A1 | 10/2007 | Agusanto et al. |
| 2008/0143820 A1 | 6/2008 | Peterson |
| 2008/0247667 A1 | 10/2008 | Jin et al. |
| 2009/0130762 A1 | 5/2009 | Paliard et al. |
| 2009/0141966 A1 | 6/2009 | Chen et al. |
| 2009/0244062 A1 | 10/2009 | Steedly et al. |
| 2010/0315412 A1 | 12/2010 | Sinha et al. |
| 2011/0234750 A1* | 9/2011 | Lai ........................ G03B 37/04 348/37 |
| 2011/0311104 A1 | 12/2011 | Sinha et al. |
| 2012/0019614 A1 | 1/2012 | Murray et al. |
| 2012/0099804 A1 | 4/2012 | Aguilera et al. |
| 2012/0127169 A1 | 5/2012 | Barcay et al. |
| 2012/0223936 A1 | 9/2012 | Aughey et al. |
| 2012/0237111 A1 | 9/2012 | Sinha et al. |
| 2012/0249957 A1* | 10/2012 | Shibata ................ A61B 3/0025 351/206 |
| 2012/0274738 A1 | 11/2012 | Shi et al. |
| 2012/0289826 A1 | 11/2012 | Graumann et al. |
| 2012/0300020 A1 | 11/2012 | Arth et al. |
| 2012/0314040 A1 | 12/2012 | Kopf et al. |
| 2013/0063549 A1 | 3/2013 | Schnyder et al. |
| 2013/0182066 A1 | 7/2013 | Ishimoto |
| 2014/0118479 A1 | 5/2014 | Rapoport et al. |
| 2014/0184585 A1 | 7/2014 | Unger et al. |
| 2014/0184596 A1 | 7/2014 | Unger et al. |
| 2014/0184631 A1 | 7/2014 | Unger et al. |
| 2014/0267343 A1 | 9/2014 | Arcas et al. |
| 2014/0267587 A1 | 9/2014 | Arcas et al. |
| 2014/0267588 A1 | 9/2014 | Arcas et al. |
| 2014/0267600 A1 | 9/2014 | Arcas et al. |
| 2016/0119537 A1* | 4/2016 | Rapoport .............. G06T 3/4038 348/36 |
| 2017/0257565 A1 | 9/2017 | Arcas et al. |

FOREIGN PATENT DOCUMENTS

| | | |
|---|---|---|
| CN | 102187309 A | 9/2011 |
| CN | 102750274 A | 10/2012 |
| CN | 102918858 A | 2/2013 |

OTHER PUBLICATIONS

Lipski, et al., "Virtual Video Camera: Image-Based Viewpoint Navigation Through Space and Time", In Proceedings of Computer Graphics Forum, vol. 29, Issue 8, Dec. 1, 2010, 12 Pages.

Marbach, Jonathan, "Image Blending and View Clustering for Multi-Viewer Immersive Projection Environments", In Proceedings of the IEEE Virtual Reality Conference, Mar. 14, 2009, pp. 51-54.

Micusik, et al., "Piecewise Planar City 3D Modeling from Street View Panoramic Sequences", In Proceeding of IEEE Conference on Computer Vision and Pattern Recognition, Jun. 20, 2009, 7 Pages.

Negishi, et al., "Calibration of Omnidirectional Stereo for Mobile Robots", In Proceedings of the IEEE/RSJ International Conference on Intelligent Robots and Systems, vol. 3, Sep. 28, 2004, pp. 2600-2605.

"International Preliminary Report on Patentability Issued in PCT Application No. PCT/US2014/023873", dated Jul. 20, 2015, 12 Pages.

"International Search Report and Written Opinion Issued in PCT Application No. PCT/US2014/023873", dated Oct. 9, 2014, 22 Pages.

"Second Written Opinion Issued in PCT Application No. PCT/US2014/023873", dated Feb. 12, 2015, 15 Pages.

"International Preliminary Report on Patentability Issued in PCT Patent Application No. PCT/US2014/023888", dated Jun. 17, 2015, 8 Pages.

"International Search Report and Written Opinion Issued in PCT Application No. PCT/US2014/023888", dated Jul. 24, 2014, 9 Pages.

"Second Written Opinion Issued in PCT Application No. PCT/US2014/023888", dated Feb. 12, 2015, 7 Pages.

"International Preliminary Report on Patentability Issued in PCT Application No. PCT/US2014/023915", dated May 15, 2015, 12 Pages.

"International Search Report and Written Opinion Issued in PCT Application No. PCT/US2014/023915", dated Jun. 10, 2014, 12 Pages.

"Second Written Opinion Issued in PCT Application No. PCT/US2014/023915", dated Jan. 5, 2015, 9 Pages.

"International Preliminary Report on Patentability Issued in PCT Application No. PCT/US2014/023980", dated Jul. 13, 2015, 8 Pages.

"International Search Report and Written Opinion Issued in PCT Patent Application No. PCT/US2014/023980", dated Jul. 7, 2014, 12 Pages.

"Second Written Opinion Issued in PCT Application No. PCT/US2014/023980", dated Apr. 2, 2015, 9 Pages.

Reinhard, et al., "Color Transfer between Images.", In Proceedings of the IEEE Computer Graphics and Applications, vol. 21, Issue 5, Sep. 2001, 10 Pages.

Rice, Frank, "Introducing the Office (2007) Open XML File Formats", Retrieved From: http://msdn.microsoft.com/en-us/library/aa338205%28v=office.12%29.aspx, May 2006, 28 Pages.

Rother, et al., "GrabCut—Interactive Foreground Extraction Using Iterated Graph Cuts", In Proceedings of the ACM Transactions on Graphics, vol. 23, Issue 3, Aug. 2004, pp. 309-314.

Schreer, et al., "Geometrical Design Concept for Panoramic 3D Video Acquisition", In Proceedings of the 20th European Signal Processing Conference, Aug. 27, 2012, pp. 2757-2761.

(56) References Cited

OTHER PUBLICATIONS

Snavely, et al., "Photo Tourism: Exploring Photo Collections in 3D", In Proceedings of the ACM Transactions on Graphics, vol. 25, Issue 3, Jul. 1, 2006, 11 Pages.
Snavely, Keith N., "Scene Reconstruction and Visualization from Internet Photo Collections", In Doctoral Dissertation, Apr. 19, 2009, 210 Pages.
Stack, Dan, "Panorama Stitching", Retrieved From: http://dpbestflow.org/image-editing/panorama-stitching, Feb. 27, 2012, 20 Pages.
Summa, et al., "Panorama Weaving: Fast and Flexible Seam Processing", In Proceedings of the ACM Transactions on Graphics, vol. 31, Issue 4, Jul. 31, 2012, 11 Pages.
Swaninathan, et al., "A Perspective on Distortions", In Proceedings of the IEEE Computer Society Conference on Computer Vision and Pattern Recognition, vol. 2, Jun. 18, 2003, 8 Pages.
Szeliski, Richard, "Image Alignment and Stitching: A Tutorial", In Proceedings of the Foundations and Trends® in Computer Graphics and Vision, vol. 2, Issue 1, Oct. 2004, 87 Pages.
"Euclidean Space", Retrieved From: https://en.wikipedia.org/wiki/Euclidean_space, Retrieved on: Jan. 28, 2014, 9 Pages.
"Learn How to Create Gigapixel Macro Photographs", Retrieved From: https://web.archive.org/web/20111202034333/www.gigamacro.com/learn-how/, Dec. 2, 2011, 4 Pages.
"Manifold", Retrieved From: https://en.wikipedia.org/wiki/Manifold, Jan. 28, 2014, 14 Pages.
"Mathematics", Retrieved From: https://en.wikipedia.org/wiki/Mathematics, Jan. 24, 2014, 13 Pages.
"Open Packaging Conventions", Retrieved From: https://en.wikipedia.org/wiki/Open_Packaging_Conventions, Dec. 27, 2013, 7 Pages.
"Photosynth", Retrieved From: https://web.archive.org/web/20130302145455/http://photosynth.net/about.aspx, Mar. 2, 2013, 2 Pages.
"Topological space", Retrieved From: https://en.wikipedia.org/wiki/Topological_space, Jan. 14, 2014, 8 Pages.
"Final Office Action Issued in U.S. Appl. No. 13/804,543", dated Aug. 6, 2015, 13 Pages.
"Non Final Office Action Issued in U.S. Appl. No. 13/804,543", dated Feb. 10, 2015, 12 Pages.
"Final Office Action Issued in U.S. Appl. No. 13/804,895", dated Aug. 13, 2015, 20 Pages.
"Final Office Action Issued in U.S. Appl. No. 13/804,895", dated Aug. 11, 2016, 30 Pages.
"Final Office Action Issued in U.S. Appl. No. 13/804,895", dated Aug. 25, 2017, 24 Pages.
"Non Final Office Action Issued in U.S. Appl. No. 13/804,895", dated Feb. 13, 2017, 29 Pages.
"Non Final Office Action Issued in U.S. Appl. No. 13/804,895", dated Feb. 26, 2016, 26 Pages.
"Non Final Office Action Issued in U.S. Appl. No. 13/804,895", dated Feb. 25, 2015, 18 Pages.
"Final Office Action Issued in U.S. Appl. No. 13/826,091", dated Jan. 14, 2016, 26 Pages.
"Non-Final Office Action Issued in U.S. Appl. No. 13/826,091", dated Aug. 5, 2015, 22 Pages.
"Non-Final Office Action Issued in U.S. Appl. No. 13/826,091", dated Sep. 9, 2016, 20 Pages.
"Final Office Action Issued in U.S. Appl. No. 13/826,423", dated Aug. 2, 2016, 23 Pages.
"Final Office Action Issued in U.S. Appl. No. 13/826,423", dated Sep. 23, 2015, 20 Pages.
"Non Final Office Action Issued in U.S. Appl. No. 13/826,423", dated Apr. 23, 2015, 17 Pages.
"Non Final Office Action Issued in U.S. Appl. No. 13/826,423", dated Feb. 2, 2016, 19 Pages.
Yang, et al., "Structure and Pose from Single Images of Symmetric Objects with Applications to Robot Navigation", In Proceedings of the IEEE International Conference on Robotics and Automatics, Sep. 14-19, 2003, pp. 1013-1020.
"Office Action Issued in European Patent Application No. 14715498.3", dated Sep. 2, 2016, 11 Pages.

"Office Action Issued in European Patent Application No. 14715498.3", dated Oct. 23, 2017, 7 Pages.
Xiaodong, Zhang, "Research and Implementation of an Interactive Panoramic System Based on a Static Image", In Full Text Database of China Excellent Master Degree Thesis (with English Abstract), Information Technology Series, Mar. 2012, 45 Pages.
"Office Action Issued in European Patent Application No. 14719556.4", dated Sep. 6, 2018, 8 Pages.
Uyttendaele, et al., "Eliminating Ghosting and Exposure artifacts in image mosaics", In Proceedings of the IEEE Computer Society Conference on Computer Vision and Pattern Recognition, vol. 2, Dec. 8, 2001, pp. 509-516.
"Office Action Issued in European Patent Application No. 14724823.1", dated Feb. 24, 2017, 6 Pages.
"Non-Final Office Action Issued in U.S. Appl. No. 15/603,568", dated Aug. 11, 2017, 6 Pages.
"First Office Action Issued in Chinese Patent Application No. 201480014983.2", dated Mar. 22, 2017, 13 Pages.
"First office action and Search Report Issued in Chinese Patent Application No. 201480015030.8", dated Sep. 28, 2017, 16 Pages.
"Second Office Action Issued in Chinese Patent Application No. 201480015030.8", dated Jun. 1, 2018, 5 Pages.
"First Office Action and Search Report Issued in Chinese Patent Application No. 201480015275.0", dated Feb. 2, 2018, 15 Pages.
"Second Office Action Issued in Chinese Patent Application No. 201480015275.0", dated Aug. 1, 2018, 5 Pages.
Agarwala, et al., "Interactive Digital Photomontage", In Journal of ACM Transactions on Graphics, vol. 23, Issue 3, Aug. 1, 2004, pp. 294-302.
Agarwala, et al., "Panoramic Video Textures", In Journal of ACM Transactions on Graphics, vol. 24, Issue 3, Jul. 1, 2005, pp. 821-827.
Boykov, et al., "Interactive Graph Cuts for Optimal Boundary & Region Segmentation of Objects in N-D Images", In Proceedings of the Eighth IEEE International Conference on Computer Vision, vol. 1, Jul. 7, 2001, pp. 105-112.
Chen, Shenchang Eric, "QuickTime® VR—An Image-Based Approach to Virtual Environment Navigation", In Proceedings of the 22nd annual conference on Computer graphics and interactive techniques, Sep. 15, 1995, pp. 29-38.
Chen, et al., "View Interpolation for Image Synthesis", In Proceedings of the 20th Annual Conference on Computer Graphics and Interactive Techniques, Sep. 9, 1993, pp. 279-288.
Davis, James, "Mosaics of Scenes With Moving Objects", In Proceedings of the IEEE Computer Society Conference on Computer Vision and Pattern Recognition, Jun. 23, 1998, pp. 354-360.
Debevec, et al., "Efficient View-Dependent Image-Based Rendering with Projective Texture-Mapping", In Proceedings of the 9th Eurographics Workshop on Rendering Techniques, Jun. 29, 1998, 13 Pages.
Debevec, et al., "Modeling and Rendering Architecture from Photographs: A Hybrid Geometry-And Image-Based Approach", In Proceedings of the 23rd Annual Conference on Computer Graphics and Interactive Techniques, Aug. 1, 1996, pp. 11-20.
Duggan, Sean, "Fixing Panorama Alignment in Potoshop C S4", Retrieved From: https://layersmagazine.com/fixing-panorama-alignment-in-photoshop-cs4.html, Nov. 11, 2009, 12 Pages.
Gao, et al., "An Interactive Editing Tool for Correcting Panoramas", In Proceedings of the ACM SIGGRAPH Asia Technical Briefs, Nov. 28, 2012, 4 Pages.
Geraerts, Roland, "Camera Planning in Virtual Environments Using the Corridor Map Method", In Proceedings of the Second International Workshop on Motion in Games, vol. 5884, Nov. 21, 2009, pp. 194-206.
Hill, et al., "Withindows: A Framework for Transitional desktop and Immersive User Interfaces", In Proceedings of the IEEE Symposium on 3D User Interfaces, Mar. 8, 2008, 8 Pages.
Kamphues, Fred, "Tips and Tricks from the Pros", Retrieved From: https://web.archive.org/web/20141022161013/http://www.sandisk.com:80/consumer/camera-and-camcorder-memory/taking-better-photo-video/panorama-photography/, Feb. 9, 2013, 2 Pages.
Kang, et al., "Scene Transition Based on Image Registration for Web-Based Virtual Tour", In Proceedings of the Ninth Lasted International Conference on Internet and Multimedia Systems and Applications, Jan. 2005, 6 Pages.

(56) References Cited

OTHER PUBLICATIONS

Kang, et al., "Virtual Navigation of Complex Scenes using Clusters of Cylindrical Panoramic Images", In Cambridge Research Laboratory, Technical Report Series CRL 97/5, Sep. 1997, 30 Pages.

* cited by examiner

IMAGE CAPTURE AND ORDERING

CROSS-REFERENCE TO RELATED APPLICATIONS

This application is a Continuation patent application of and claims the benefit of U.S. Non-Provisional patent application Ser. No. 15/603,568, filed May 24, 2017 and titled "Image Capture and Ordering," which in turn claims priority to U.S. Non-Provisional patent application Ser. No. 13/826,091, filed Mar. 14, 2013 and titled "Image Capture and Ordering," the disclosures of each of which are hereby incorporated herein by reference in their entirety.

BACKGROUND

Many users may create image data using various devices, such as digital cameras, tablets, mobile devices, smart phones, etc. For example, a user may capture an image of a beach using a mobile phone while on vacation. The user may upload the image to an image sharing website, and may share the image with other users. In an example of image data, one or more images may be stitched together to create a panorama of a scene depicted by the one or more images. If the one or more images are stitched together in an arbitrary order, then the panorama may comprise seam lines (e.g., resulting from an object moving within the scene during image capture, and thus being in different locations in different images) or other undesirable effects. If the one or more images were captured from viewpoints having unaligned focal points, then parallax errors may result in the panorama, for example.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for ordering images for panorama stitching and/or for providing a focal point indicator for image capture are provided herein.

In some embodiments of ordering images for panorama stitching, an image stack, comprising one or more images that may be stitched together to generate a panorama, is maintained. For example, a user may have captured eight images depicting a renovated basement from various viewpoints. The eight images and/or subsequently captured images of the renovated basement may be maintained according to a particular ordering within the image stack, and may be used for generating a panorama of the renovated basement. The image stack may be segmented into one or more regions. In an example, a region may correspond to a single position within the image stack (e.g., a first region corresponds to a top position of the image stack, a second region corresponds to a bottom position of the image stack, and one or more additional regions correspond to positions between the top position and the bottom position). In another example, a region may correspond to multiple positions within the image stack (e.g., a first region corresponds to a first half of the image stack (e.g., top four images) and a second region corresponds to a second half of the image stack (e.g., bottom four images)).

A first ordering preference may be associated with a first region of the image stack (e.g., a top position of the image stack); a second ordering preference may be associated with a second region of the image stack (e.g., a non-top position of the image stack); and/or other ordering preferences may be associated with other regions of the image stack. In an example of adding a current image to the image stack, the first ordering preference corresponds to manually captured image criteria and the second ordering preference corresponds to automatically captured image criteria. If a current image is a manually captured image (e.g., a user manually captures a new image of the renovated basement), then the current image is added to the first region of the image stack (e.g., the top position of the image stack) based upon the first ordering preference. If the current image is an automatically captured image (e.g., a camera automatically captures the image of the renovated basement), then the current image is added to the second region of the image stack (e.g., a non-top position of the image stack) based upon the second ordering preference. It may be appreciated that the first ordering preference, the second ordering preference, and/or other ordering preference may correspond to other types of preferences, such as temporal criteria (e.g., recently captured images are added to the first region, while previously captured images are added to the second region). In this way, the image stack may be maintained by ordering images within the image stack.

During generation of the panorama, the one or more images within the image stack may be stitched according to a stitching order. In an example, the stitching order specifies that the first region has a stitching priority relative to the second region. The stitching order may, for example, associate the first region with a foreground bias and the second region with a background bias. For example, images having a relatively higher priority, such as relatively newer images or manually captured images, may be used to stitch the foreground, while images having a relatively lower priority, such as relatively older images or automatically captured images, may be used to stitch the background. It will be appreciated, however, that a foreground bias and/or a background bias does not necessarily imply a hard ordering towards foreground and/or background. Rather, a foreground bias may, for example, imply an increased probability that an image will be visible (e.g., in the foreground or elsewhere), and a background bias may, for example, imply a decreased probability that an image will be visible (e.g., in the background or elsewhere). It may be appreciated that the stitching order may correspond to other ordering priorities or portions of the panorama.

In some embodiments of providing a focal point indictor for image capture, a current position of a camera may be tracked (e.g., a standalone camera, a camera associated with a computing device, etc.). For example, positional data and/or orientation data of the camera may be tracked in real-time while the camera is used to capture one or more images depicting a scene (e.g., one or more images of a renovated basement). The one or more images may be used to generate a visualization of the scene, such as a spin movie, a panorama, a non-panorama visualization, etc. A focal point indicator may be provided through the camera to aid a user in capturing a current image of the scene (e.g., a current image depicting a portion of the renovated basement not already depicted by one or more previously capture images; a current image captured from a focal point of the scene; etc.). For example, the current position of the camera may be compared with a focal point of the scene depicted by one or more previously captured images. Based upon the comparison, a focal point indicator may be generated. The focal point indicator may be provided during capture of a current image of the scene. For example, a visual indicator (e.g., an on/off spot indicator, a target icon, etc.) may be displayed through the camera to indicate a viewpoint (e.g., associated with a camera position/orientation) from which the user may capture the current image. In this way, the user may be aided in capturing one or more images used to create a visualization of the scene (e.g., so that a current image is captured from a focal point corresponding to a focal point of one or more previously captured images).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
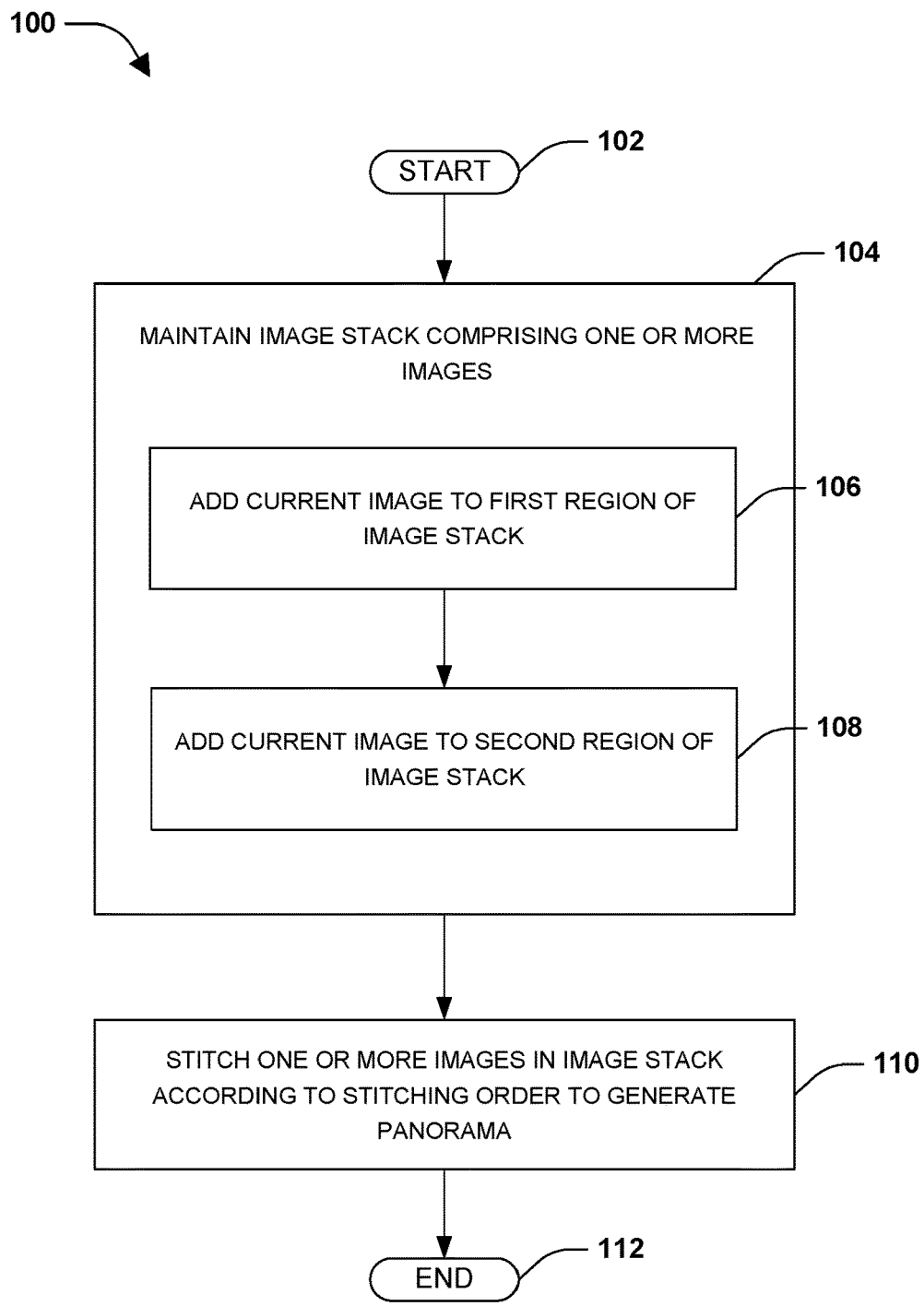
FIG. 1 is a flow diagram illustrating an exemplary method of ordering images for panorama stitching.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of ordering images for panorama stitching is illustrated by an exemplary method 100 of FIG. 1. At 102, the method starts. At 104, an image stack, comprising one or more images that may be stitched together to generate a panorama, is maintained (e.g., image stack 210 of FIG. 2). For example, the one or more images may depict a scene of a kitchen renovation project from various viewpoints. The one or more images may be stitched together to create a panorama depicting the kitchen renovation project (e.g., a user may visually explore the kitchen renovation project based upon multidimensional navigation in the panorama). An ordering of the one or more images and/or subsequently captured images may be maintained within the image stack. In this way, images within the image stack may be efficiently stitched together according to a stitching order to generate the panorama (e.g., relatively more significant images may be used to represent relatively prominent features of the panorama, such as in a foreground of the panorama).

In an example, a current image may be added to the image stack based upon one or more ordering preferences. At 106, responsive to the current image corresponding to a first ordering preference, the current image is added to a first region of the image stack. In an example where the first ordering preference corresponds to a later in time criteria, the current image is added to a top position of the image stack based upon the current image having a relatively newer timestamp (e.g., example 300 of FIG. 3). In another example where the first ordering preference corresponds to a manually captured image criteria, the current image is added to a first half of the image stack based upon the current image having been manually captured by a user (e.g., example 400 of FIG. 4). At 108, responsive to the current image corresponding to a second ordering preference, the current image is added to a second region of the image stack. In an example where the second ordering preference corresponds to an earlier in time criteria, the current image is added to a bottom position of the image stack based upon the current image having a relatively older timestamp (e.g., example 300 of FIG. 3). In another example where the second ordering preference corresponds to an automatically captured image, the current image is added to a second half of the image stack based upon the current image having been automatically captured by a camera device (e.g., example 400 of FIG. 4). It may be appreciated that other ordering preferences may be specified and/or other regions may be designated for the image stack.

In an example, one or more images within the image stack may be reordered based upon input modifying a position of an image within the image stack. For example, a user may have captured an image depicting a relatively significant portion of the kitchen renovation project (e.g., an image depicting a new kitchen island). However, the image may have a relatively low stitching priority based upon the image corresponding to an ordering preference that placed the image into a region of the image stack having a relatively lower stitching priority (e.g., the image may have been automatically captured). Thus, the user may indicate that the image is to be moved into a region having a relatively higher stitching priority (e.g., the user may assign a relatively high rating to the image; the user may drag and drop the image within an image stack user interface; the user may designate the image as significant to the user; etc.). Accordingly, the image may be repositioned within the image stack. In an example, repositioning the image may result in another image being reassigned from a region to another region (e.g., a first image may be reassigned from the first region to the second region; a second image may be reassigned from the second region to the first region or to a third region; etc.).

At 110, the one or more images in the image stack are stitched according to a stitching order to generate the panorama. The stitching order may specify that the first region has a stitching priority relative to the second region. In an example, one or more images within the first region may be stitched before one or more images within the second region. In another example, one or more images within the first region are used to stitch together a foreground of the panorama, while one or more images within the second region are used to stitch together a background of the panorama. In this way, the panorama may be generated by stitching one or more images from the image stack according to the stitching order. At 112, the method ends.

Figure 2:
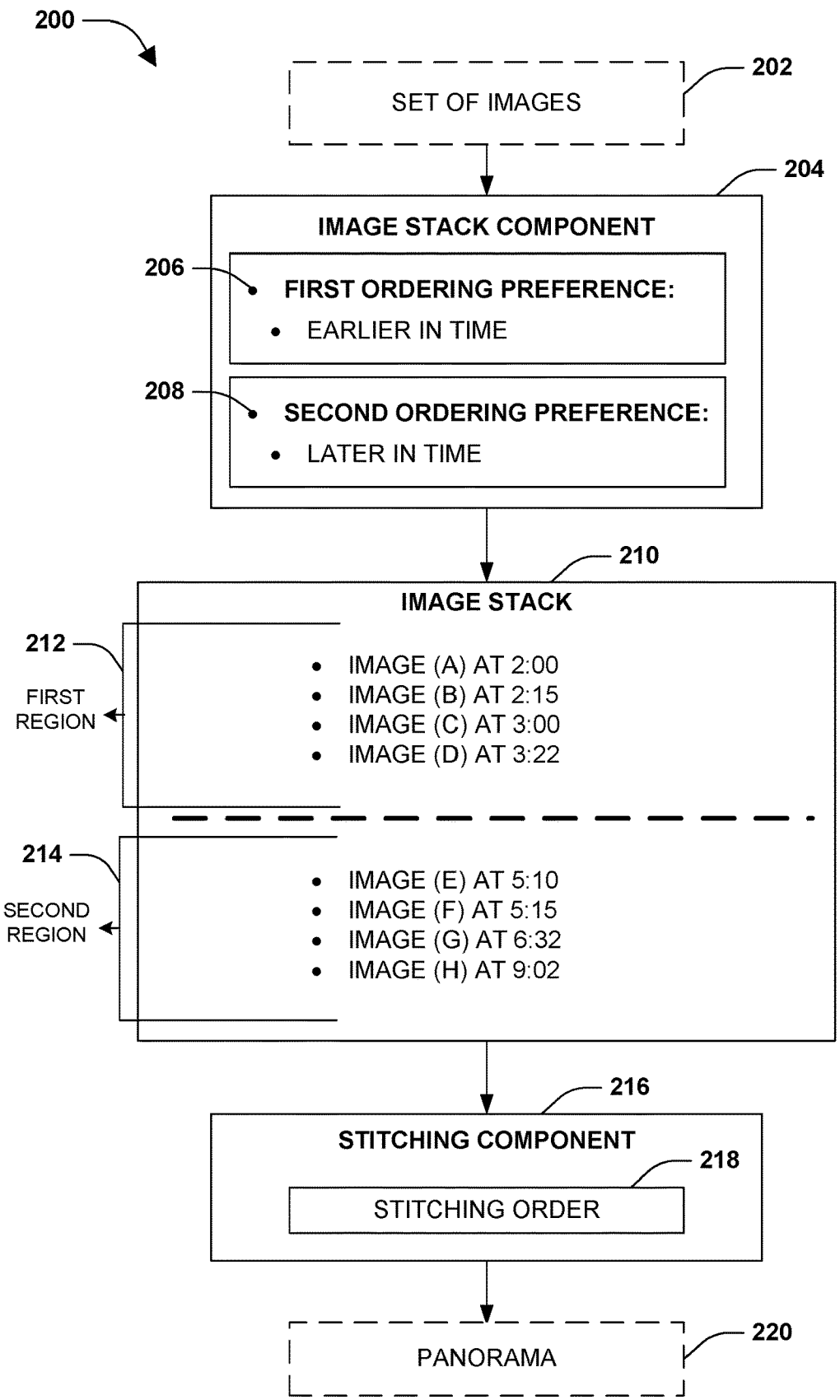
FIG. 2 is a component block diagram illustrating an exemplary system for ordering images for panorama stitching.

FIG. 2 illustrates an example of a system 200 configured for ordering images for panorama stitching. The system 200 comprises an image stack component 204 and/or a stitching component 216. The image stack component 204 is configured to maintain an image stack 210 comprising one or more images that may be stitched together by the stitching component 216 to generate a panorama 220 of a scene depicted by the one or more images. For example, the image stack component 204 is configured to store a set of images 202 within the image stack 210 based upon one or more ordering preferences, such as a first ordering preference 206, a second ordering preference 208, and/or other ordering preferences not illustrated. In an example, the first ordering preference 206 corresponds to an earlier in time criteria, such that one or more current images having relatively older timestamps may be added into a first region 212, having a relatively higher stitching priority, of the image stack 210 (e.g., image (A), image (B), image (C), and image (D) have relatively older timestamps compared with image (E), image (F), image (G), and image (H)). The second ordering preference 208 corresponds to a later in time criteria, such that one or more current images having relatively newer timestamps may be added into a second region 214, having a relatively lower stitching priority, of the image stack 210 (e.g., image (E), image (F), image (G), and image (H) have relatively newer timestamps compared with image (A), image (B), image (C), and image (D)). In this way, the set of images 202 may be stored within one or more regions of the image stack 210 based upon the one or more ordering preferences.

It will be appreciated that, as provided herein, more than just two regions (or merely a single region) may be comprised within an image stack and/or that differing numbers of images may be comprised within different regions, such as a first number of images in a first region and a second different number of images in a second region. Various ordering preferences may exist, where an ordering preference may pertain to one or more regions and/or one or more images in an image stack. Ordering preferences maybe weighted, given priority relative to one another, etc. such that a location of an image in the image stack may be a function of multiple ordering preferences, for example. A manually captured image may be placed in a first, top, prioritized, etc. region relative to a second non-manually captured image, for example, even if the non-manually captured image was captured more recently than the manually captured image, for example.

The stitching component 216 is configured to stitch one or more images within the image stack 210 according to a stitching order 218 to generate the panorama 220. In an example, the stitching order 218 may specify that images within the first region 212 are to be stitched before images within the second region 214. In another example, the stitching order 218 may specify that images within the first region 212 are to be stitched for relatively prominent features of the panorama 220 (e.g., foreground bias), and that images within the second region 214 are to be stitched for relatively less prominent features of the panorama 220 (e.g., background bias). In this way, the panorama 220 may be generated by stitching one or more images within the image stack 210 based upon the stitching order 218.

Figure 3:
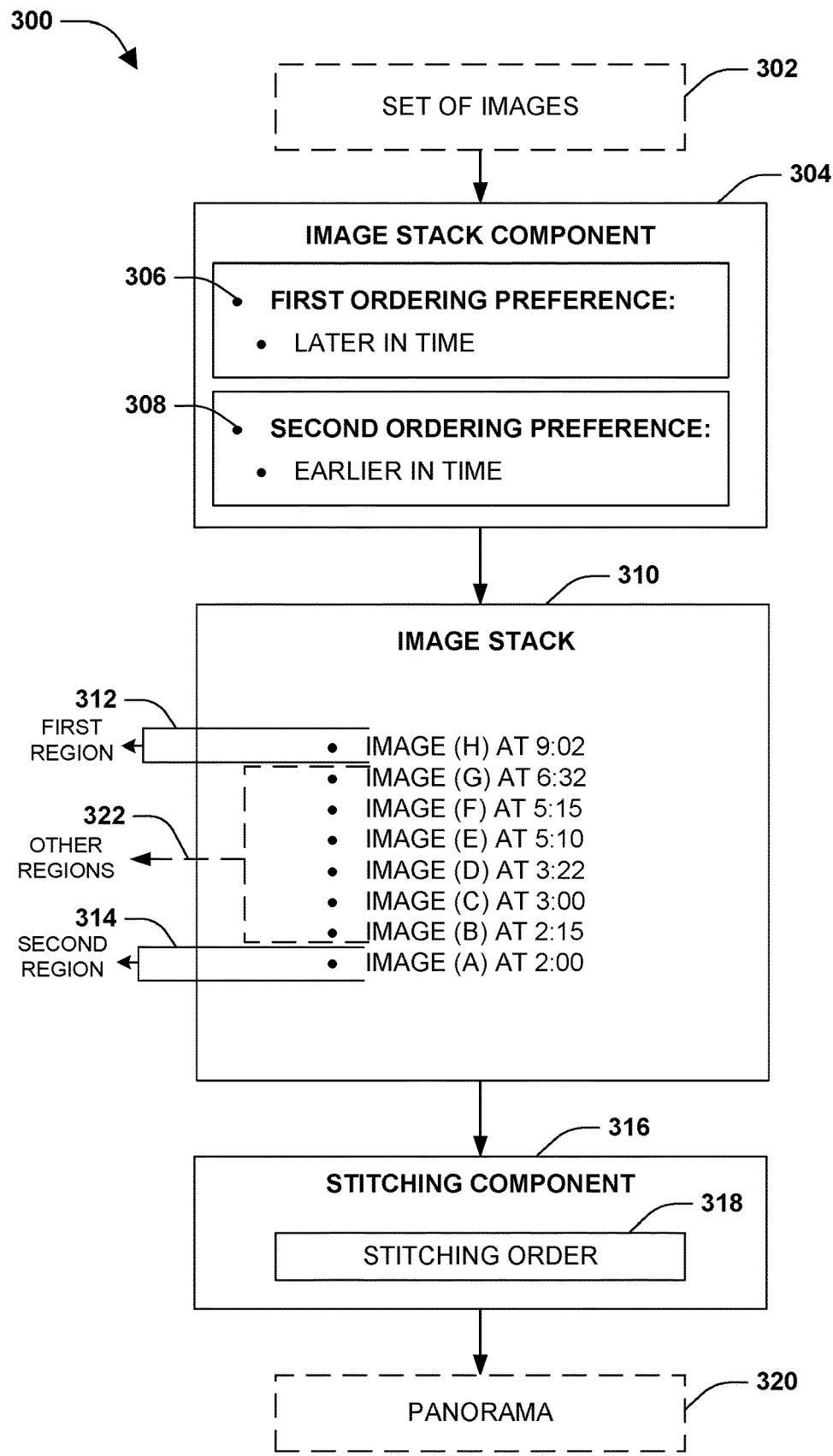
FIG. 3 is a component block diagram illustrating an exemplary system for ordering images for panorama stitching.

FIG. 3 illustrates an example of a system 300 configured for ordering images for panorama stitching. The system 300 comprises an image stack component 304 and/or a stitching component 316. The image stack component 304 is configured to maintain an image stack 310 comprising one or more images that may be stitched together by the stitching component 316 to generate a panorama 320 of a scene depicted by the one or more images. For example, the image stack component 304 is configured to store a set of images 302 within the image stack 310 based upon one or more ordering preferences, such as a first ordering preference 306, a second ordering preference 308, and/or other ordering preferences not illustrated. In an example, the first ordering preference 306 corresponds to a later in time criteria, such that a current image having a relatively newer timestamp may be added into a first region 312, having a relatively higher stitching priority, of the image stack 310 (e.g., image (H) has a relatively recent timestamp compared with other images within the image stack 310). The second ordering preference 308 corresponds to an earlier in time criteria, such that a current image having relatively older timestamp may be added into a second region 314, having a relatively lower stitching priority, of the image stack 310 (e.g., image (A) has a relatively older timestamp compared with other images within the image stack 310). In this way, the set of images 302 may be stored within one or more regions of the image stack 310, such as other regions 322, based upon the one or more ordering preferences.

The stitching component 316 is configured to stitch one or more images within the image stack 310 according to a stitching order 318 to generate the panorama 320. In an example, the stitching order 318 may specify that images within the first region 312 are to be stitched first, images within other regions 322 are to be stitched after images within the first region 312, and images within the second region 314 are to be stitched after images within the other regions 322. In another example, the stitching order 318 may specify that images within the first region 312 are to be stitched for relatively prominent features of the panorama 320 (e.g., foreground bias), images within the second region 314 are to be stitched for relatively less prominent features of the panorama (e.g., background bias), and that images within the other regions 322 can be stitch for any features of the panorama 320. In this way, the panorama 320 may be generated based upon stitching one or more images within the image stack 310 based upon the stitching order 318.

Figure 4:
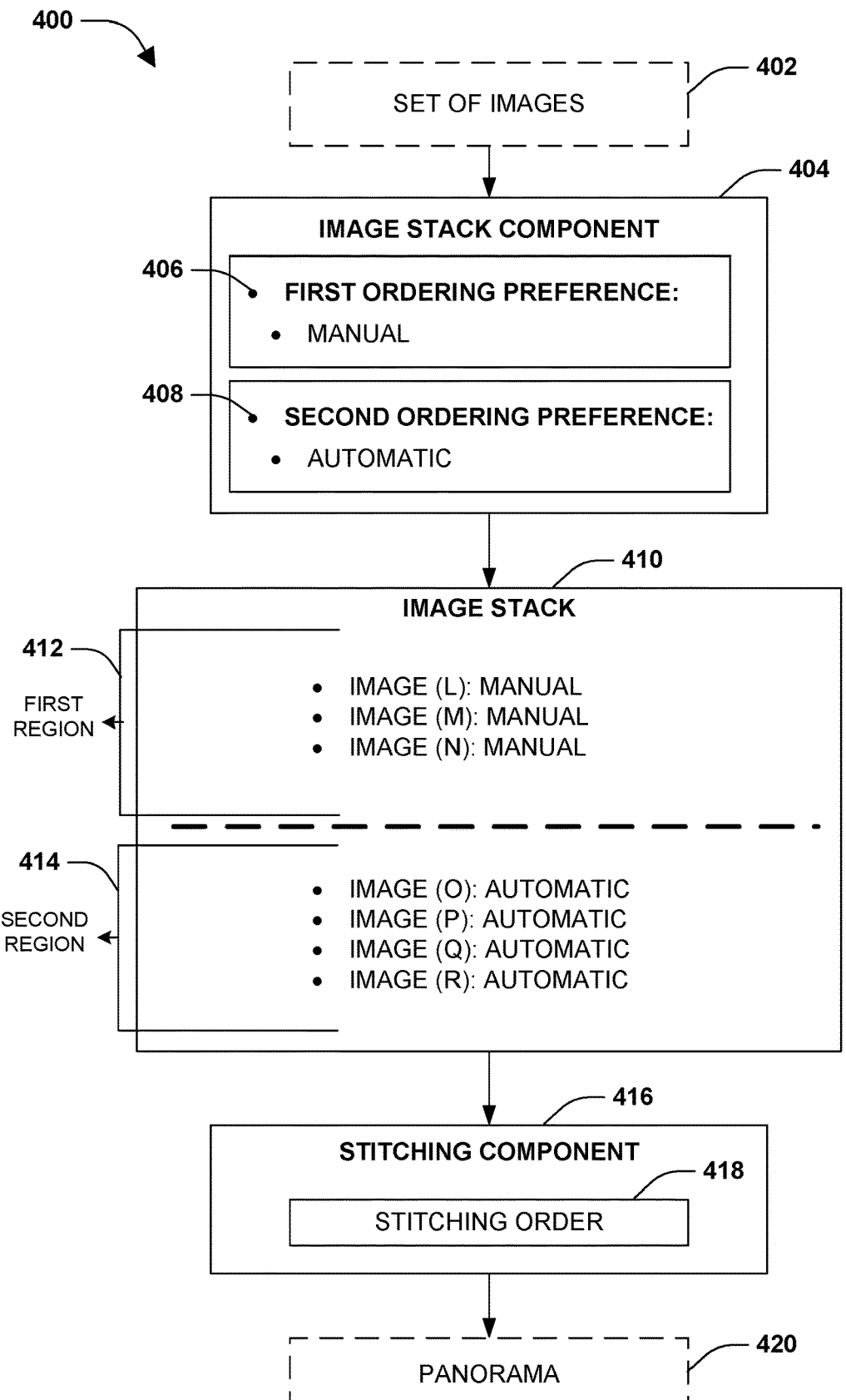
FIG. 4 is a component block diagram illustrating an exemplary system for ordering images for panorama stitching.

FIG. 4 illustrates an example of a system 400 configured for ordering images for panorama stitching. The system 400 comprises an image stack component 404 and/or a stitching component 416. The image stack component 404 is configured to maintain an image stack 410 comprising one or more images that are to be stitched together by the stitching component 416 to generate a panorama of a scene depicted by the one or more images. For example, the image stack component 404 is configured to store a set of images 402 within the image stack 410 based upon one or more ordering preferences, such as a first ordering preference 406, a second ordering preference 408, and/or other ordering preferences not illustrated. In an example, the first ordering preference 406 corresponds to a manually captured image criteria, such that one or more current images that are manually captured may be added into a first region 412, having a relatively higher stitching priority, of the image stack 410 (e.g., image (L), image (M), and image (N) may have been manually captured by a user). The second ordering preference 408 corresponds to an automatically captured image criteria, such that one or more current images that are automatically captured may be added into a second region 414, having a relatively lower stitching priority, of the image stack 410 (e.g., image (O), image (P), image (Q), and image (R) may have been automatically captured by a camera). In this way, the set of images 402 may be stored within one or more regions of the image stack 410 based upon the one or more ordering preferences.

The stitching component 416 is configured to stitch one or more images within the image stack 410 according to a stitching order 418 to generate the panorama 420. In an example, the stitching order 418 may specify that images within the first region 412 are to be stitched before images within the second region 414. In another example, the stitching order 418 may specify that images within the first region 412 are to be stitched for relatively prominent features of the panorama 420 (e.g., foreground bias), and that images within the second region 414 are to be stitched for relatively less prominent features of the panorama 420 (e.g., background bias). In this way, the panorama 420 may be generated based upon stitching one or more images within the image stack 410 based upon the stitching order 418.

Figure 5:
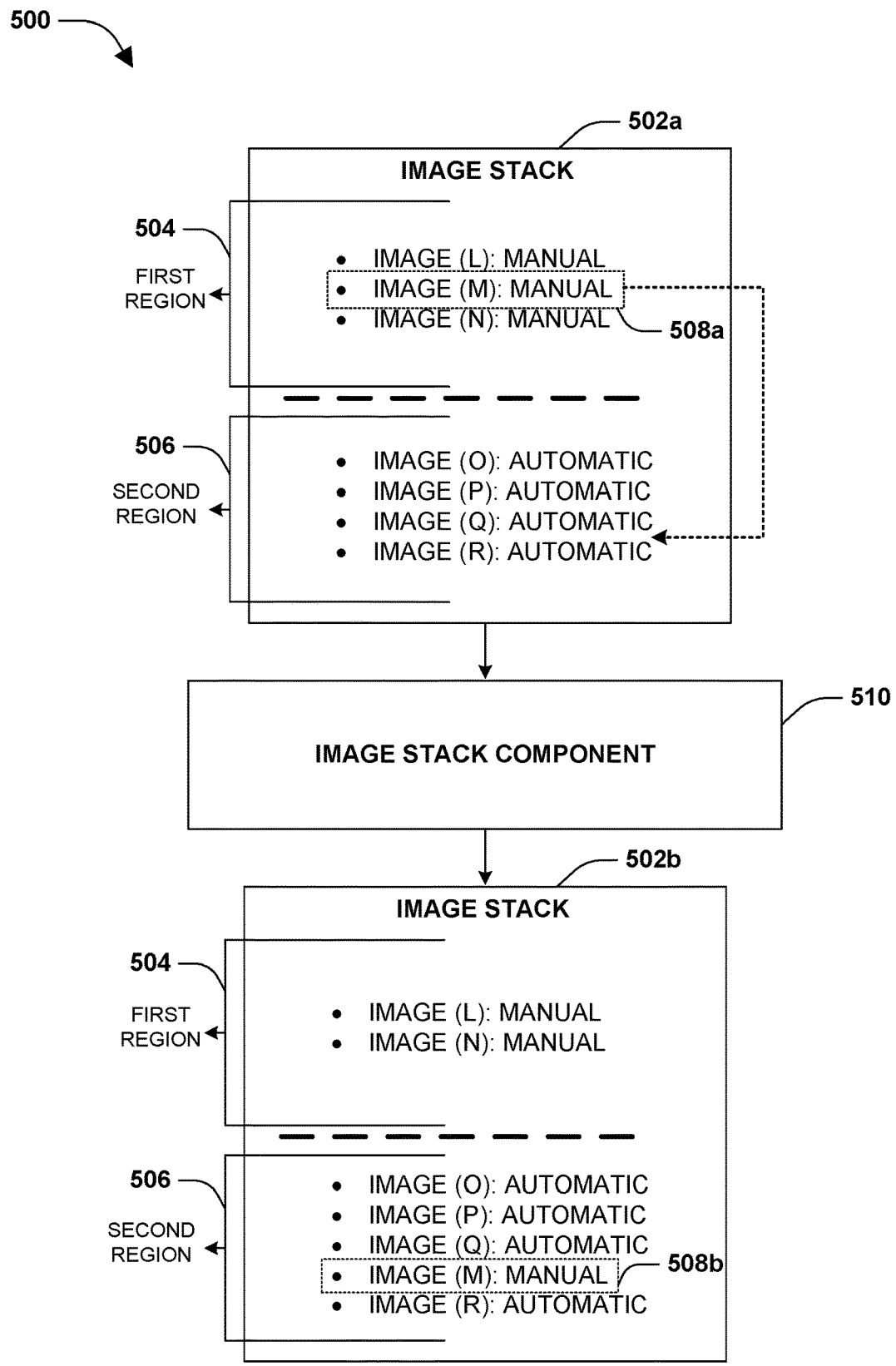
FIG. 5 is a component block diagram illustrating an exemplary system for reordering images within an image stack for panorama stitching.

FIG. 5 illustrates an example of a system 500 configured for reordering images within an image stack for panorama stitching. The system 500 may comprise an image stack component 510. The image stack component 510 may be configured to maintain an image stack (e.g., image stack 502*a* before reordering and/or image stack 502*b* after reordering) comprising one or more images that may be stitched according to a stitching order to generate a panorama. The image stack may comprise a first region 504 and a second region 506. The one or more images within the first region 504 may have a relatively higher stitching priority than one or more images within the second region 506. The image stack component 510 may be configured to maintain an order of images within the image stack. For example, the image stack component 510 may store image (L), image (M), and image (N) within the first region 504 of the image stack 502*a* based upon such images being manually captured. The image stack component 510 may store image (O), image (P), image (Q), and image (R) within the second region 506 of the image stack 502*a* based upon such image being automatically captured.

The image stack component 510 may be configured to reorder one or more images within the image stack 502*a* based upon input indicating that a position of an image within the image stack 502 is to be modified, resulting in the image stack 502*b*. For example, a user may indicate that image (M) is a relatively insignificant image that was manually taken by the user. The indication may be interpreted as input indicating that a position of image (M) 508*a* within the image stack 502*a* is to be modified. Responsive to the input, the image stack component 510 may reassign the image (M) 508*a* from the first region 504 to the second region 506 as image (M) 508*b* of image stack 502*b* because the second region 506 has a relatively lower stitching priority than the first region 504. In this way, image (M) 508*b* may be reassigned to the second region 506 of the image stack 502*b*. It may be appreciated that image stack 502*a* and image stack 502*b* are the same image stack, but depict the time stack before and after the repositioning of image (M).

Figure 6:
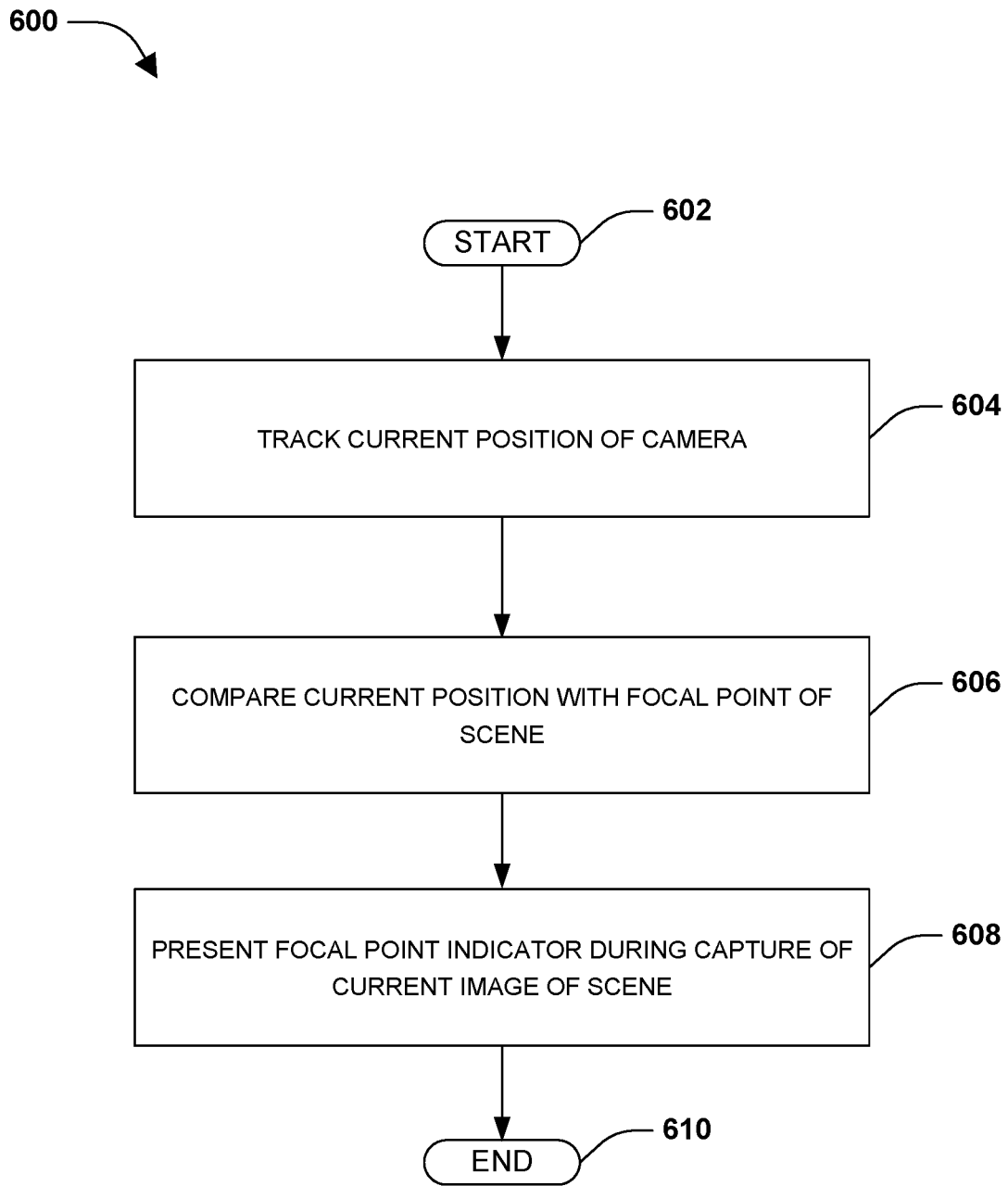
FIG. 6 is a flow diagram illustrating an exemplary method of providing a focal point indicator for image capture.

An embodiment of providing a focal point indicator for image capture is illustrated by an exemplary method 600 of FIG. 6. In an example, a camera may be used to capture one or more images of a scene (e.g., images depicting a renovated kitchen), which may be used to generate a visualization of the scene (e.g., a spin movie, a panorama, a non-panorama visualization, and/or other visualizations). Because more than one image may be used to generate the visualization, guidance may be provided for image capture (e.g., an indicator may be provided to a user, which may indicate a viewpoint from which a next image may be captured so that the scene is adequately represented or "seen" by images used to generate the visualization of the scene, otherwise the visualization may be incomplete because of missing image information). At 602, the method starts. At 604, a current position of a camera is tracked (e.g., a standalone camera or a camera integrated into another computing device, such as a tablet or mobile device). For example, positional data and/or orientation data of the camera are tracked to determine the current position (e.g., data derived from one or more previously captured images; data derived from GPS, data derived from a gyroscope or other positional tracking device; etc.).

At 606, the current position may be compared with a focal point of the scene, derived from one or more previously captured images, to generate a focal point indicator. The focal point of the scene may be derived from respective focal points of the one or more previously captured images of the scene. If the current position of the camera indicates that the camera is viewing the scene from a viewpoint that corresponds to the focal point of the scene, then the focal point indicator may indicate that the camera is in a correct position for capture of a current image. However, if the current position of the camera indicates that the camera is not viewing the scene from a viewpoint that corresponds to the focal point of the scene, then the focal point indicator may indicate that the camera is to be repositioned to a new viewpoint that corresponds to the focal point of the scene so that a current image may be captured from the new viewpoint.

At 608, the focal point indicator may be provided during capture of a current image of the scene. In an example, responsive to the current position corresponding to the focal point, the focal point indicator is not displayed through the camera because the camera is in a correct position. In another example, responsive to the current position corresponding to the focal point, the focal point indicator is displayed through the camera to indicate to a user that the camera is in a correct position. In another example, responsive to the current position not corresponding to the focal point, the focal point indicator is displayed to indicate that the camera is to be moved from the current position to a new position corresponding to the focal point (e.g., an on/off spot indicator may be displayed; a hot/cold indicator may be displayed; a focal point adjustment suggestion such as an arrow indicating a direction with which to move the camera may be displayed; and/or a plethora of other indicators may be provided to aid the user in repositioning the camera). In this way, the current image and the one or more previously captured images may be stitched based upon the focal point of the scene to generate a visualization of the scene. In some embodiments, the user may desire to stop capturing images for the visualization, and start capturing images for a new visualization. A panorama transition indictor may be provided to aid the user in repositioning the camera in order to transition into capturing images for the new visualization. The panorama transition indicator may indicate suggested camera movement to initiate image capture for the new visualization. At 610, the method ends.

Figure 7:
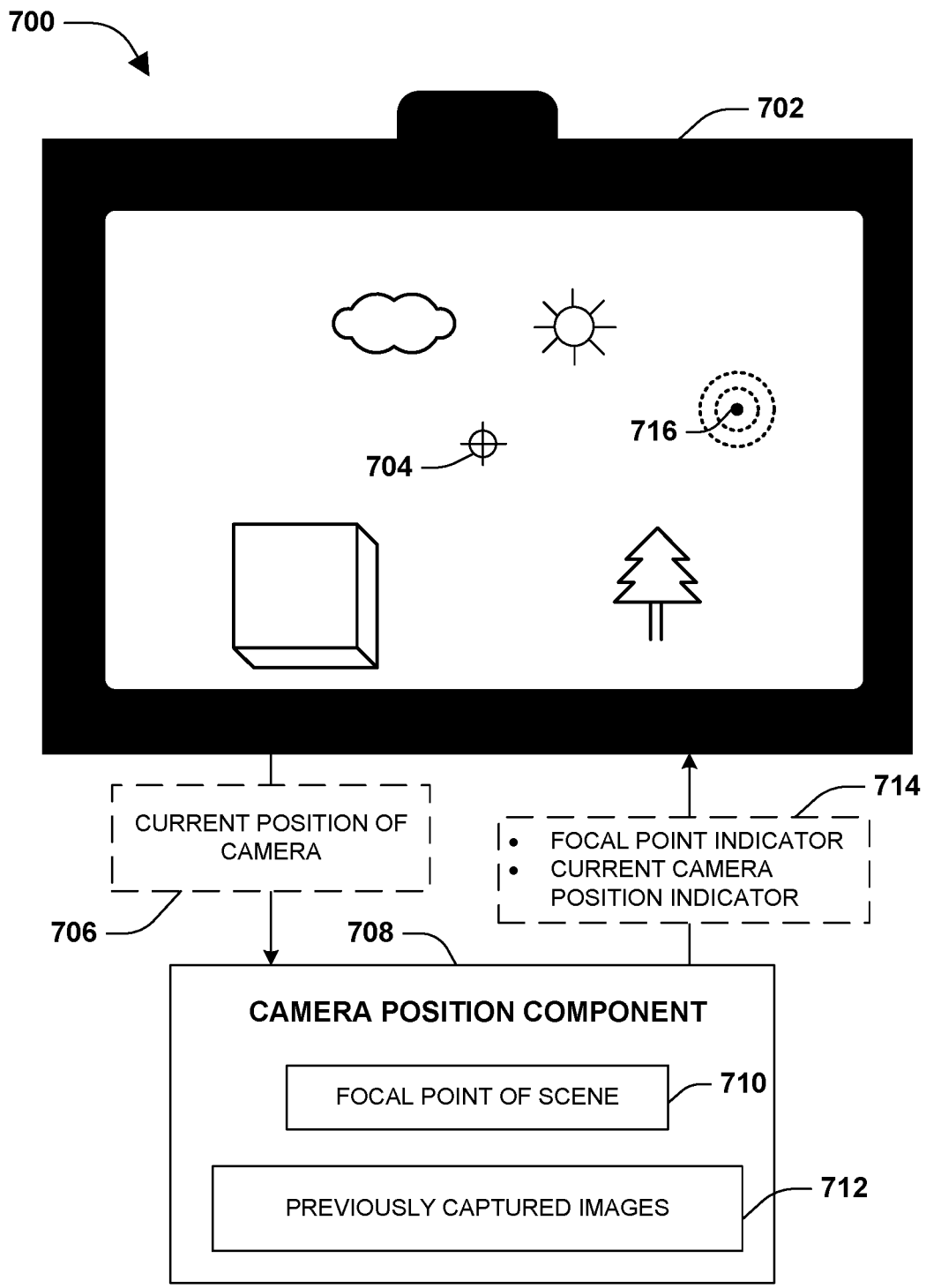
FIG. 7 is a component block diagram illustrating an exemplary system for providing a focal point indicator for image capture.

FIG. 7 illustrates an example of a system 700 configured for providing a focal point indicator 716 for image capture. The system 700 may be associated with a camera 702 used to capture one or more images depicting a scene (e.g., an outdoor space comprising a tree, a sun, a cloud, a building, etc.). The system 700 may comprise a camera position component 708. The camera position component 708 may have access to one or more previously captured images 712 of the scene (e.g., a first previously captured image depicting the scene from a northern facing viewpoint, a second previously captured image depicting the scene from a southeastern facing viewpoint, a third previously captured image depicting a ground view of the scene, a fourth previously captured image depicting a sky view of the scene, etc.).

In an example, the one or more previously captured images 712 may not depict the scene from a western facing viewpoint, and thus a user may attempt to capture a current image of the scene from the western facing viewpoint using the camera 702. The camera position component 708 may guide the user in capturing the current image so that the current image is captured from a focal point corresponding to a focal point of the scene 710 derived from focal points of the one or more previously captured image 712. In particular, the camera position component 708 tracks a current position 706 of the camera 702. The camera position component 708 may compare the current position 706 with the focal point of the scene 710 to generate the focal point indicator 716. The camera position component 708 may be configured to provide 714 the focal point indicator 716 and/or a current camera position indicator 704, which may aid the user in repositioning the camera 702 so that a current position of the camera 702 corresponds to the focal point of the scene 710 (e.g., such that the current camera position indicator 704 is aligned with the focal point indicator 716). In an example, the focal point indicator 716 may be modified (e.g., increased in size, reduced in size, displayed, hidden, etc.) based upon repositioning of the camera 702 (e.g., the focal point indicator 716 may be increased (or decreased) in size as a current position of the camera has an increased correspondence to the focal point of the scene 710; the focal point indicator 716 may be decreased (or increased) in size as a current position of the camera 702 has a decreased correspondence to the focal point of the scene 710; the focal point indicator 716 may be hidden when a current position of the camera 702 corresponds to the focal point of the scene 710 within a threshold correspondence; etc.).

Figure 8:
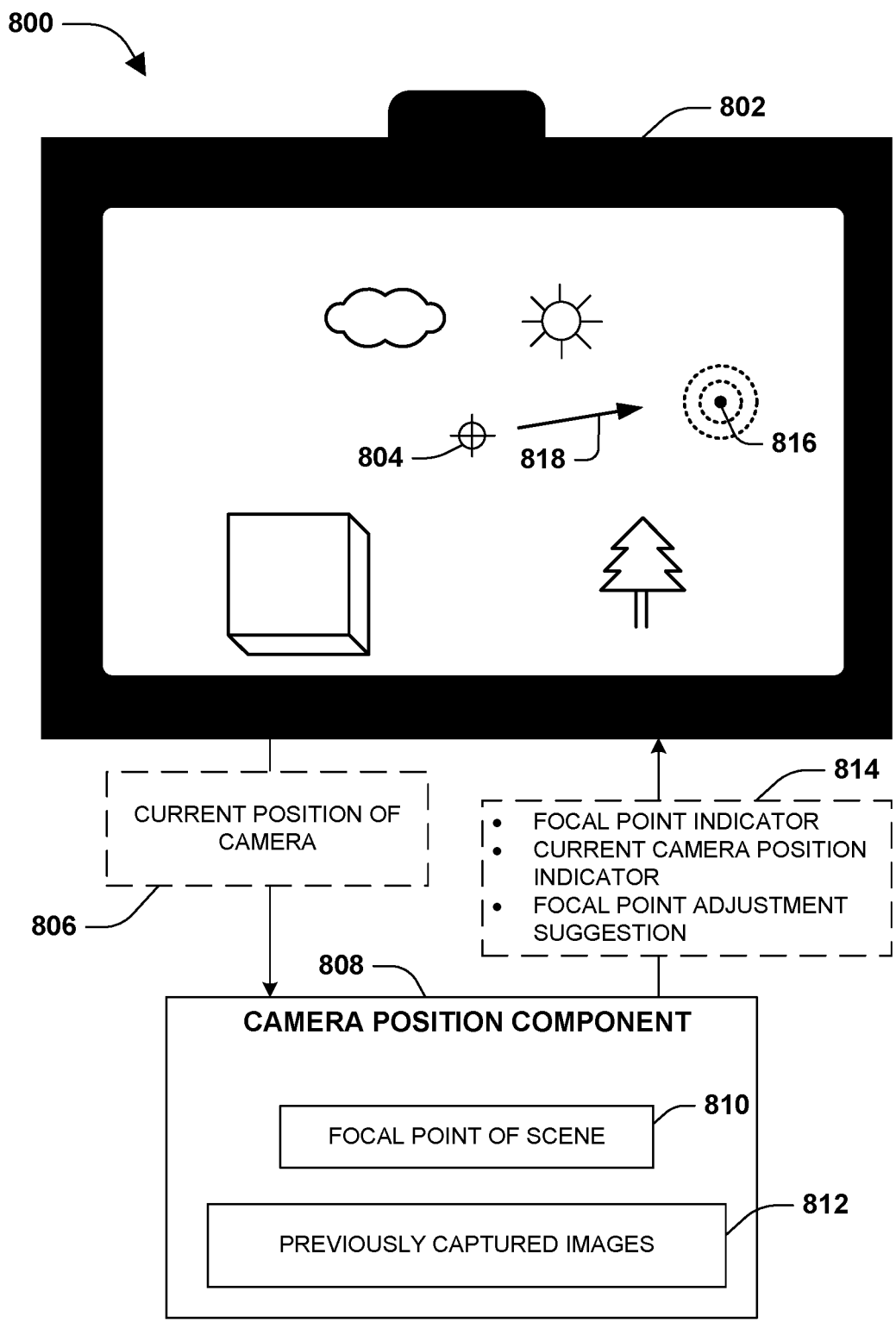
FIG. 8 is a component block diagram illustrating an exemplary system for providing a focal point indicator and/or a focal point adjustment suggestion for image capture.

FIG. 8 illustrates an example of a system 800 configured for providing a focal point indicator 816 and/or a focal point adjustment suggestion 818 for image capture. The system 800 may be associated with a camera 802 used to capture one or more images depicting a scene. The system 800 may comprise a camera position component 808. The camera position component 808 may have access to one or more previously captured images 812 of the scene. The camera position component 808 may guide the user in capturing a current image of the scene from a viewpoint corresponding to a focal point of the scene 810. For example, the camera position component 808 may compare a current position 806 of the camera 802 to the focal point of the scene 810. The camera position component 808 may be configured to provide 814 the focal point indicator 816, the focal point adjustment suggestion 818, and/or a current camera position indicator 804. The focal point adjustment suggestion 818 (e.g., an arrow, difference image and/or other user interface indicator) may aid the user in repositioning the camera 802 so that a current position of the camera 802 corresponds to the focal point of the scene 810 (e.g., such that the current camera position indicator 804 is aligned with the focal point indicator 816).

Figure 9:
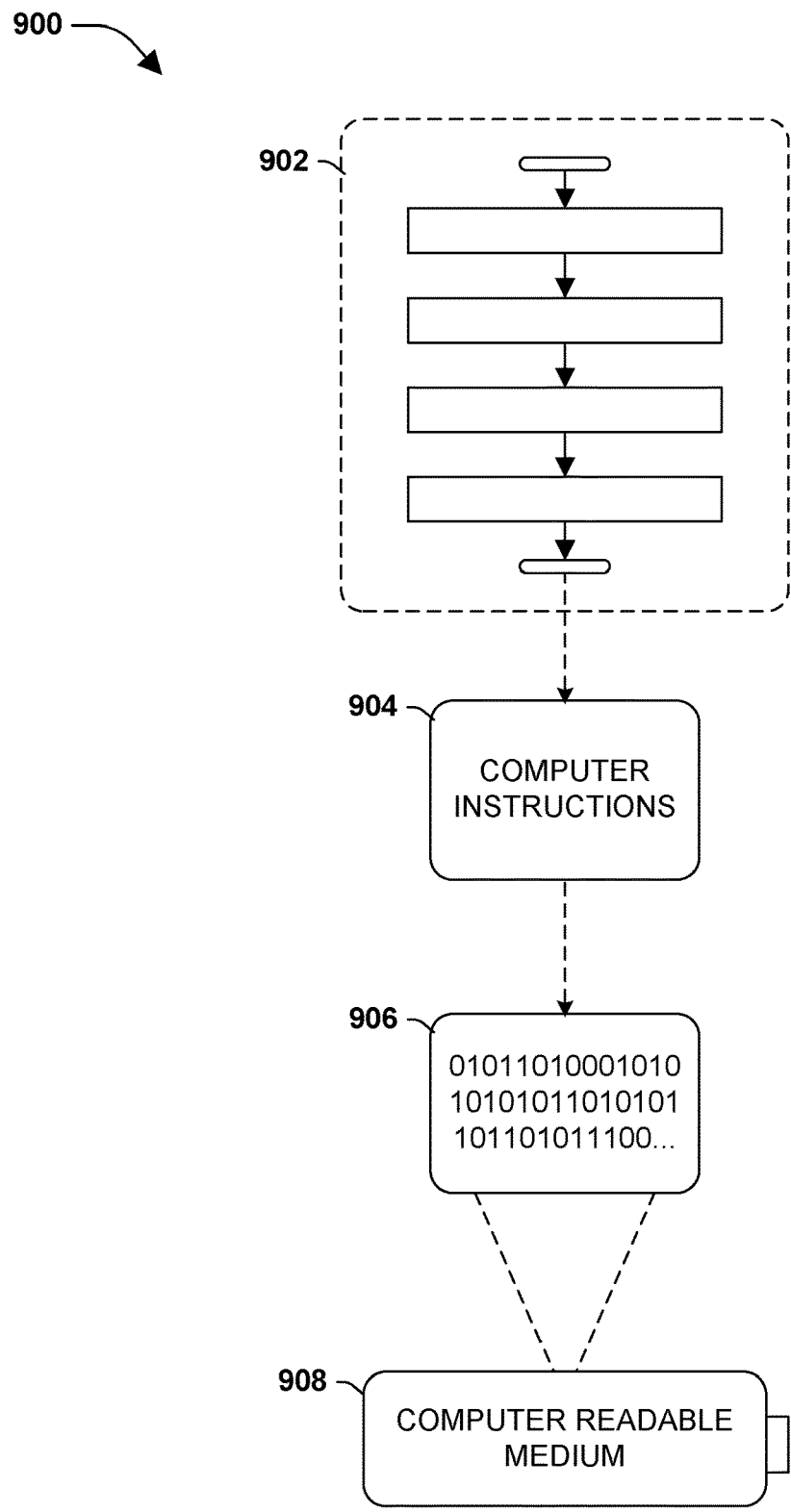
FIG. 9 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1 and/or at least some of the exemplary method 600 of FIG. 6, for example. In some embodiments, the processor-executable instructions 904 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 700 of FIG. 7, and/or at least some of the exemplary system 800 of FIG. 8, for example. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
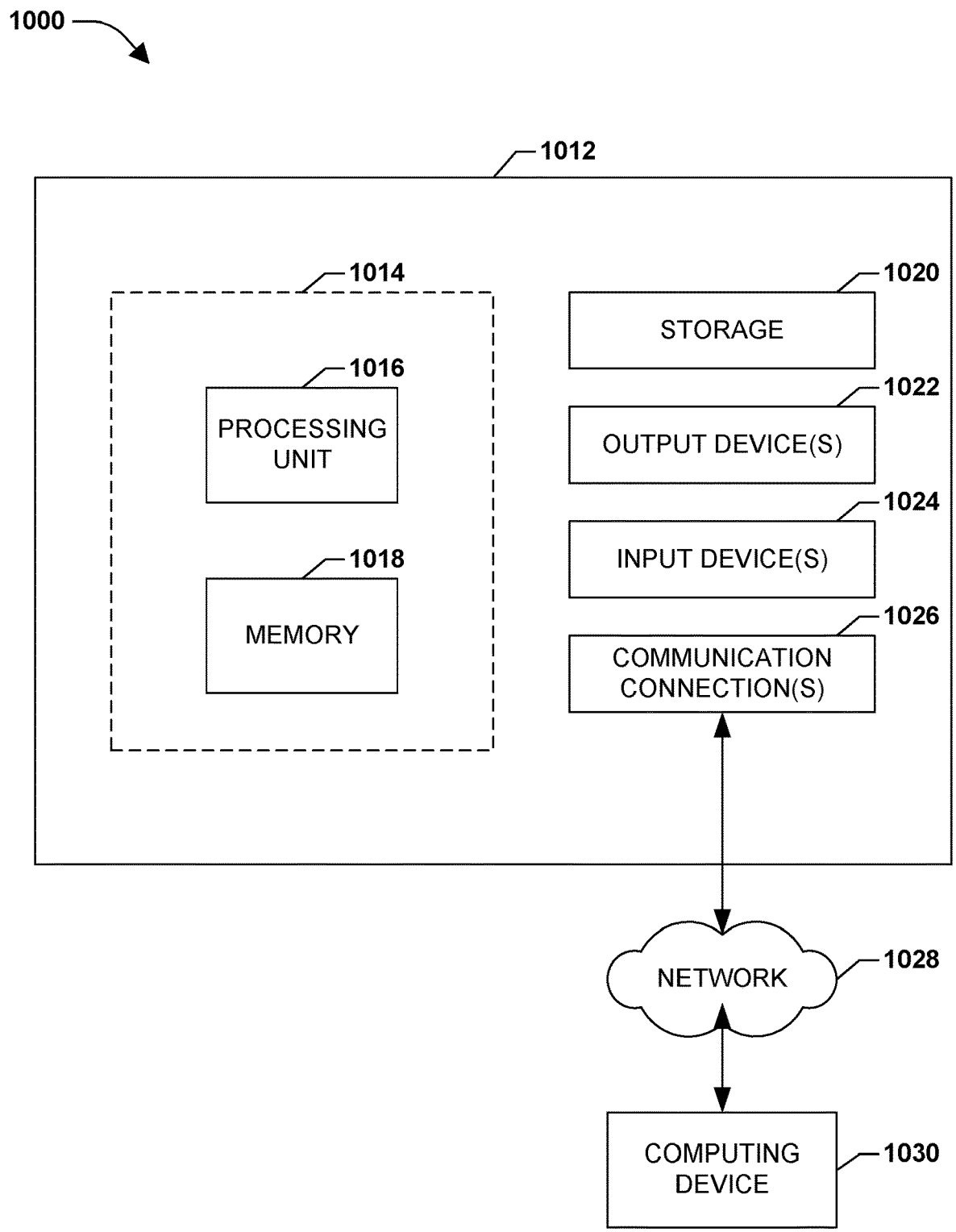
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only an example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. In some embodiments, depending on the exact configuration and type of computing device, memory 1018 is volatile, such as RAM, non-volatile, such as ROM, flash memory, etc., or some combination of the two. This configuration is illustrated in FIG. 10 by dashed line 1014.

In other embodiments, device 1012 includes additional features or functionality. For example, device 1012 also includes additional storage such as removable storage or non-removable storage, including, but not limited to, magnetic storage, optical storage, and the like. Such additional storage is illustrated in FIG. 10 by storage 1020. In some embodiments, computer readable instructions to implement one or more embodiments provided herein are in storage 1020. Storage 1020 also stores other computer readable instructions to implement an operating system, an application program, and the like. Computer readable instructions are loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media is part of device 1012.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1012 includes input device(s) 1024 such as keyboard, mouse, pen, voice input device, touch input device, infrared cameras, video input devices, or any other input device. Output device(s) 1022 such as one or more displays, speakers, printers, or any other output device are also included in device 1012. Input device(s) 1024 and output device(s) 1022 are connected to device 1012 via a wired connection, wireless connection, or any combination thereof. In some embodiments, an input device or an output device from another computing device are used as input device(s) 1024 or output device(s) 1022 for computing device 1012. Device 1012 also includes communication connection(s) 1026 to facilitate communications with one or more other devices.

Although the subject matter has been described in language specific to structural features and/or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

It will be appreciated that layers, features, elements, etc. depicted herein are illustrated with particular dimensions relative to one another, such as structural dimensions and/or orientations, for example, for purposes of simplicity and ease of understanding and that actual dimensions of the same differ substantially from that illustrated herein, in some embodiments.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A method for panorama stitching, comprising:
    storing, by a computing device, a first set of images comprising one or more images in an image stack according to a first ordering preference, the first ordering preference associated with a first region of the image stack;
    storing, by the computing device, a second set of images comprising one or more images in the image stack according to a second ordering preference, the second ordering preference associated with a second region of the image stack; and generating a panorama image including the first and second sets of images by stitching the first and the second sets of images together according to a stitching priority associated with each region of the image stack.

2. The method of claim 1, wherein the first ordering preference comprises an earlier in time criterion and the second ordering preference comprises a later in time criterion.

3. The method of claim 1, wherein the first ordering preference comprises a foreground bias and the second ordering preference comprises a background bias.

4. The method of claim 1, wherein the first ordering preference comprises a manual capture criterion and the second ordering preference comprises an automatic capture criterion.

5. The method of claim 1, further comprising:
receiving an input corresponding to an image in the first set of images indicating the image is to be associated with the second region in the image stack; and
responsive to the input, associating the image with the second region.

6. A method for panorama stitching, comprising:
receiving, by a computing device, a new image;
storing, by the computing device, the new image in a first region of an image stack according to a first ordering preference, the image stack storing one or more existing images and each existing image is stored according to the first ordering preference or a different second ordering preference, wherein a first portion of the existing images is stored in the first region of the image stack and a second portion of the existing images is stored in a different second region of the image stack; and
generating a panorama image including the first and second sets of images by stitching the new image and the one or more existing images together according to a first stitching priority associated with the first region and a different second stitching priority associated with the second region.

7. The method of claim 6, wherein the first ordering preference comprises an earlier in time criterion and the second ordering preference comprises a later in time criterion.

8. The method of claim 6, wherein the first ordering preference comprises a foreground bias and the second ordering preference comprises a background bias.

9. The method of claim 6, wherein the first ordering preference comprises a manual capture criterion and the second ordering preference comprises an automatic capture criterion.

10. The method of claim 6, further comprising:
receiving an input corresponding to the new image indicating the image is to be associated with the second region in the image stack; and
responsive to the input, associating the new image with the second region.

11. A system, comprising:
one or more processors; and
one or more storage devices operably connected to the one or more processors for storing instructions, that when executed by the one or more processors, cause the one or more processors to:

store a first plurality of images in an image stack according to a first ordering preference, the first ordering preference associated with a first region of the image stack;
store a second plurality of images in the image stack according to a different second ordering preference, the second ordering preference associated with a second region of the image stack; and
generate a panorama image including the first and the second plurality of images by stitching the first and the second plurality of images together according to stitching priorities associated with the first and the second regions, wherein the first stitching priority is higher than the second stitching priority and each image associated with the first region of the image stack is stitched before each image associated with the second region of the image stack.

12. The system of claim 11, wherein the first ordering preference comprises an earlier in time criterion and the second ordering preference comprises a later in time criterion.

13. The system of claim 11, wherein the first ordering preference comprises a foreground bias and the second ordering preference comprises a background bias.

14. The system of claim 11, wherein the first ordering preference comprises a manual capture criterion and the second ordering preference comprises an automatic capture criterion.

15. The system of claim 11, wherein:
storing the first plurality of images in the image stack according to the first ordering preference, the first ordering preference associated with the first region of the image stack comprises storing the first plurality of images in a first region of the image stack according to the first ordering preference; and
storing the second plurality of images in the image stack according to the second ordering preference, the second ordering preference associated with the second region of the image stack comprises storing the second plurality of images in a second region of the image stack according to the second ordering preference.

16. The system of claim 15, wherein the one or more storage devices store further instructions, that when executed by the one or more processors, cause the one or more processors to:
receiving an input to modify a position of an image in the image stack; and
based on the input, reposition the image in the image stack such that the image is stored in a different region of the image stack.

17. The method of claim 1, wherein the stitching priority of each region of the image stack determines the order in which each of the one or more images of the first set of images are stitched relative to each of the one or more images of the second set of images.

18. The method of claim 17, wherein each of the images of the first set of images are newer than each of the images of the second set of images, and when generating the panorama image, the first set of images are associated with a higher stitching priority than the second set of images based upon the age of the first set of images and are stitched before the second set of images based on the higher priority.

19. The method of claim 17, wherein each of the images of the first set of images are manually captured and each of the images of the second set of images are automatically captured, and when generating the panorama image, the first set of images are associated with a higher stitching priority than the second set of images based upon the manual capturing of the first set of images and are stitched before the second set of images based upon the higher priority.

20. The method of claim 17, wherein each of the images of the first set of images comprise a foreground bias and each of the images of the second set of images comprise a background bias, and when generating the panorama image, the first set of images are associated with a higher stitching priority than the second set of images based upon the foreground bias of the first set of images and are stitched before the second set of images based upon the higher priority.

* * * * *